United States Patent
Kimura et al.

(10) Patent No.: US 8,304,469 B2
(45) Date of Patent: Nov. 6, 2012

(54) HIGHLY HEAT-CONDUCTIVE EPOXY RESIN COMPOSITION

(75) Inventors: Kazushi Kimura, Kanagawa (JP); Takahiro Okamatsu, Kanagawa (JP)

(73) Assignee: Yokohama Rubber Co., Ltd., Tokyo (JP)

( * ) Notice: Subject to any disclaimer, the term of this patent is extended or adjusted under 35 U.S.C. 154(b) by 339 days.

(21) Appl. No.: 12/455,466

(22) Filed: Jun. 2, 2009

(65) Prior Publication Data

US 2009/0298965 A1 Dec. 3, 2009

(30) Foreign Application Priority Data

Jun. 3, 2008 (JP) ................................. 2008-145379

(51) Int. Cl.
C08K 3/28 (2006.01)
C08K 3/00 (2006.01)
C08K 3/20 (2006.01)
C08K 3/08 (2006.01)
C08K 3/38 (2006.01)
C09K 3/10 (2006.01)
C09K 3/00 (2006.01)

(52) U.S. Cl. ............ 522/170; 522/168; 522/71; 522/81; 522/83; 524/404; 524/443; 524/447; 524/444; 528/403; 528/408; 528/480; 528/492; 252/182.11; 252/182.12; 252/182.13; 252/182.26; 252/182.23

(58) Field of Classification Search .................. 528/403, 528/408, 480, 492; 252/182.11, 182.12, 252/182.13, 182.26, 182.23; 522/168, 170; 524/404, 443, 437, 444
See application file for complete search history.

(56) References Cited

U.S. PATENT DOCUMENTS

| 7,037,399 B2 * | 5/2006 | Tong et al. ..................... 156/256 |
| 2002/0043728 A1 * | 4/2002 | Harada ........................... 257/787 |
| 2003/0171456 A1 * | 9/2003 | Tong et al. ..................... 523/404 |
| 2004/0183215 A1 * | 9/2004 | Fujieda et al. ................. 257/793 |
| 2006/0125119 A1 * | 6/2006 | Xiao et al. ..................... 257/793 |

FOREIGN PATENT DOCUMENTS

| JP | 64-070523 | 3/1989 |
| JP | 02-011619 | 1/1990 |
| JP | 02-238044 | 9/1990 |
| JP | 04-320416 | 11/1992 |
| JP | 10-168288 | 6/1998 |
| JP | 2000-302985 | 10/2000 |
| JP | 2001-139770 | 5/2001 |
| JP | 2003-073455 | 3/2003 |
| JP | 2004-075835 | 3/2004 |
| JP | 2006-008854 | 1/2006 |
| WO | WO 2007052846 A1 * | 5/2007 |

* cited by examiner

*Primary Examiner* — Sanza McClendon

(74) *Attorney, Agent, or Firm* — Brinks Hofer Gilson & Lione

(57) ABSTRACT

A highly heat-conductive epoxy resin composition, which comprises epoxy resin in a liquid state at room temperature, a latent curing agent, a highly heat-conductive filler, and a non-ionic surfactant, where preferably the latent curing agent is mixed with a portion of the epoxy resin in a liquid state at room temperature to form a master batch, can keep a relatively low viscosity, even if a large amount of the filler is contained, and can be cured at a relatively low temperature for a short time, and has a distinguished storage stability as one-component composition.

8 Claims, No Drawings

HIGHLY HEAT-CONDUCTIVE EPOXY RESIN COMPOSITION

TECHNICAL FIELD

The present invention relates to a highly heat-conductive epoxy resin composition, and more particularly to a highly heat-conductive epoxy resin composition having distinguished storage stability and heat curability.

BACKGROUND ART

Recent advances in size reduction or higher performances of electronic devices have been necessitating efficient heat radiation from semiconductors-mounted circuit substrates or various chips- or devices-mounted electronic parts, as an important problem. Accordingly, highly heat-conductive materials have been now used in adhesion of various electronic parts or coatings onto circuit substrates.

Such materials include sheet-shaped moldings and paste-state adhesives. The sheet-shaped moldings involve such problems that adhesion must be conducted through pressure fitting parts of such as clips, bolts, etc. or upon tight contact thereof on desired positions through a sticking agent, etc. The paste-state adhesive involves such problems that the curing requires a relatively long time or elevated temperatures, or furthermore that the viscosity is so high due to a higher content of a heat-conductive filler, thereby the workability will be deteriorated.

To improve the production efficiency of semiconductor devices on the basis of flip chip bonding, epoxy resin compositions have been so far proposed, that can form cured resins having short curing time on pressure welding process and having voidless and distinguished adhesiveness. Concerning epoxy resin composition in a liquid state at room temperature, comprising an epoxy resin and a curing agent, it is known that the viscosity of the epoxy resin composition can be lowered by using an addition reaction product of 2-methylimidazole and 3,4-epoxycyclohexanecarboxylic acid-3',4'-epoxycyclohexylmethyl ester, i.e. an alicyclic epoxy compound, as the curing agent.
[Patent Document 1] JP-A-2006-8854

Epoxy resin for use in the afore-mentioned epoxy resin composition includes, for example, bisphenol F type epoxy resin, bisphenol A type epoxy resin, naphthalene ring-structured epoxy resin, hydrogenated epoxy resins thereof, alicyclic epoxy resin, etc., and it is further known that bis(3,6-diglycidyloxynaphthyl)methane, i.e. a naphthalene ring-structured tetrafunctional epoxy resin, can be used together with these epoxy resins in a proportion of 5-40% by equivalent weight in terms of epoxide groups on the basis of total epoxy resins, and also known that electroconductive particles, e.g. polystyrene-based polymer particles with gold plated nucleus surfaces, can be further contained thereto. Patent Document 1 mentions a drastic increase in the curing speed, but fails to teach both of lowering of curing temperature and on increase in storage stability.

In the meantime, highly heat-conductive fillers having a heat conductivity such as 0.5 W/m·K, or more, for example, $Al_2O_3$, MgO, BN, AlN, $Al(OH)_3$, $Mg(OH)_2$, SiC, etc. have been so far used as a highly heat-radiatable materials to meet the recent requirements for size reduction and higher performance of electronic devices. In other words, epoxy resins containing a large amount of these highly heat-conductive fillers have been used as highly heat-radiatable materials.

To allow the epoxy resins to contain a large amount of the highly heat-conductive fillers, usually a large amount of a dispersing agent must be used. These dispersing agents are, when used together with a latent curing agent for the epoxy resin, involves such problems as deterioration of curability of epoxy resin composition or extreme deterioration of storage stability.

A resin composition for sealing, which comprises (A) epoxy resin, (B) a curing agent for epoxy resin which includes phenol resin, acid anhydride or amine-based compound, (C) an elastomer, and (D) surfactant, and for use in combination with flip chip bonding, has been so far proposed with such disclosure that the composition can contain a filler such as silica, alumina, silicon nitride, mica, white carbon, etc., or a curing promoter such as imidazole-based compounds, etc. to adjust a linear expansion coefficient of the resin composition, and with such further recommendation that the surfactant may be any of an anionic surfactant, a cationic surfactant, a non-ionic surfactant, and an amphoteric surfactant, and preferably polyoxyalkylene-modified polydimethylsiloxane as a non-ionic surfactant, because of the presence of no adverse effect on the electric characteristics of sealing agents or semiconductors, even if the surfactant is contained in a necessary proportion (i.e. 0.01-1 parts by weight, preferably 0.05-0.5 parts by weight, on the basis of 100 parts by weight of sum total of the epoxy resin and the curing agent).
[Patent Document 2] JP-A-2004-75835

However, it is disclosed that its effect is prevention of crack generation in underfillings or peeling from substrates, even if used in combination of a solder, which requires reflow at a higher temperature than the conventional, such as a lead-free solder, and that such effect can be obtained when both of the elastomer and the surfactant are contained.

Patent Document 2 makes no mention of storage stability or heat curability. In other words, it is desirable that the epoxy resin composition for use in the relevant technical field has a good storage stability and can be cured for a relatively short time or at a lower temperature, and thus it is important that both of a good storage stability and a low-temperature, short-time curability can be obtained at the same time.

DISCLOSURE OF THE INVENTION

Problem to be Solved by the Invention

The object of the present invention is to provide a highly heat-conductive epoxy resin composition, which comprises an epoxy resin, a curing agent for the epoxy resin, and a highly heat-conductive filler, and which can have a relatively low viscosity and a distinguished storage stability as one-component type composition even if a large amount of the filler is added thereto, and can be cured at a relatively low temperature for a short time.

Means for Solving the Problem

The object of the present invention can be attained by a highly heat-conductive epoxy resin composition, which comprises an epoxy resin in a liquid state at room temperature, a latent curing agent, a highly heat-conductive filler having a heat conductivity of 0.5 W/m·K or more, and a non-ionic surfactant, where the latent curing agent is used preferably by mixing with at least a portion of the epoxy resin in a liquid state at room temperature to form a master batch.

Effect of the Invention

The present highly heat-conductive epoxy resin composition has a storage stability for about one week at 20° C. and can be cured under low-temperature and short-time curing conditions, for example, 80° C. for one hour, even if a latent curing agent usually having a curing temperature of about 100° C. (such as Amicure-PN-40 as used in the following Examples 2 and 4) is used. Particularly, when the latent curing agent is used as a master batch together with the epoxy resin in a liquid state at room temperature, the curability of the highly heat-conductive epoxy resin composition and the storage stability as a one-component type composition can be further improved.

BEST MODES FOR CARRYING OUT THE INVENTION

The epoxy resin in a liquid state at room temperature (25° C.) for use in the present invention includes, for example, bisphenol type epoxy resins such as bisphenol A diglycidyl ether, bisphenol F diglycidyl ether, bisphenol AF diglycidyl ether, or linear oligomer mixtures obtained by partial condensation thereof, naphthalene type epoxy resins, bisphenyl type epoxy resins, glycidylamine type epoxy resins, alicyclic epoxy resins, dicyclopentadiene type epoxy resins, glycidyl ethers of mononuclear phenols (e.g. hydroquinone, resorcinol, catechol, pyrogallol, etc.), glycidyl esters of phthalic acid, hydrogenated phthalic acid, etc., copolymers modified with other polymers such as polyether-modified epoxy resin, silicone-modified epoxy resin, etc., and can be used alone or in a mixture of at least two thereof. Above all, bisphenol A type epoxy resin (viscosity 130 ps), bisphenol F type epoxy resin (viscosity 20 ps), bisphenol AF type epoxy resin (viscosity 1,000 ps), etc. are preferable from the viewpoints of cost and availability.

Within such a range as not to deteriorate the effect of the present invention, a portion, for example, not more than 30 wt. %, of the epoxy resin can be replaced with a monofunctional epoxy compound. The monofunctional epoxy compound includes, for example, such monoglycidyl compounds, etc. as t-butylphenyl glycidyl ether, 2-ethylhexyl glycidyl ether, isobutylphenyl glycidyl ether, phenyl glycidyl ether, etc. and can be used alone or in a mixture of at least two thereof.

The epoxy resin in a liquid state at room temperature can be used in compounding with a latent curing agent alone or together with a curing promoter to form a one component type epoxy resin composition. The latent curing agent includes, for example, a hydrolysis type latent curing agent, which cannot work as a curing agent in a tightly closed state, i.e. moisture-free state, but can only work as a curing agent by breaking the tightly closed state to initiate hydrolysis in the presence of moisture, a thermally latent curing agent, which cannot work as a curing agent at the ordinary temperature, but can only work as a curing agent by heating up to a given temperature, thereby effecting melting, fusion or activation, or a UV curing initiator, which can generate cations by light irradiation to initiate reaction with epoxide groups, etc. The hydrolysis type latent curing agent includes, for example, ketimine compounds, etc., the thermally latent curing agent includes, for example, dicyandiamide, imidazoles, hydrazines, and amines, or epoxy adducts thereof, acid anhydrides, liquid phenol, aromatic amines, etc., and the photo-curing initiator includes, for example, aromatic diazonium salts, sulfonium salts, iodonium salts, etc.

The ketimine compound as a hydrolysis type latent curing agent is not particularly limited, so far as it is a compound having a ketimine bond (N═C), and includes ketimine compounds obtained by reaction of ketone with amine.

The ketone as one component of ketimine forming compounds includes, for example, methyl ethyl ketone, methyl isopropyl ketone, methyl t-butyl ketone, methyl cyclohexyl ketone, diethyl ketone, ethyl propyl ketone, ethyl butyl ketone, dipropyl ketone, dibutyl ketone, diisobutyl ketone, etc.

The amine as one component of ketimine forming compounds is not particularly limited, and includes, for example, armatic polyamines such as o-phenylenediamine, m-phenylenediamine, p-phenylenediamine, m-xylylenediamine, diaminodiphenylmethane, diaminodiphenylsulfone, etc.; aliphatic polyamines such as ethylenediamine, propylenediamine, butylenediamine, diethylenetriamine, triethylenetetramine, tetraethylenepentamine, pentaethylenehexamine, hexamethylenediaminne, trimethylhexamethylenediamine, 1,2-propanediame, iminobispropylamine, methyliminobispropylamine, MPMD, a product of DuPont Japan, etc.; monoamines having an ether bond in the main chain such as N-aminoethylpiperazine, 3-buthoxyisopropylamine, etc., or diamines having a polyether skeleton, typically Jefamine EDR148, a product of Sun Technochemical Co.; alicyclic polyamines such as isophoronediamine, 1,3-bisaminomethylcyclohexane, 1-cyclohexylamino-3-aminopropane, 3-aminomethyl-3,3,5-trimethylcyclohexylamine, etc.; diamines having a norboranane skeleton, typically NBDA, a product of Mitsui Chemical Co.; polyamideamines having an amino group at the molecule terminals; 2,5-dimethyl-2,5-hexamethylenediamine, menthenediamine, 1,4-bis(2-amino-2-methylpropyl)piperazine, and Jefamines D230, D400, etc. having a polypropylene glycol (PPG) skeleton, products of Sun Technochemical Co.

Imidazoles for use as a thermally latent curing agent include, for example, 2-methylimidazole, 2-undecylimidazole, 2-heptadecylimidazole, 2-ethyl-4-methylimidazole, 2-phenylimidazole, 2-phenyl-4-methylimidazole, or also addition reaction products of these imidazole compounds with an epoxy compound (epoxy adducts) such as an adduct of 2-methylimidazole with 3,4-epoxycyclohexane carboxylic acid-3',4'-epoxycyclohexylmethane ester, as disclosed in Patent Document 1.

The hydrazines include, for example, adipic acid dihydrazide, isophthalic acid dihydrazide, etc., and also addition reaction products thereof with an epoxy compound (epoxy adducts).

The amines include, for example, 2-dimethylaminoethylamine, 3-dimethylamino-N-propylamine, etc., and also addition reaction products thereof with an epoxy compound (epoxy adducts).

The acid anhydride includes, for example, trimellitic acid anhydride, pyromellitic acid anhydride, hexahydrophthalic acid anhydride, methylhexahydrophthalic acid anhydride, nadic acid anhydride, methyl nadic acid anhydride, tetrahydrophthalic acid anhydride, methyl tetrahydrophthalic acid anhydride, dodecenyl succinic acid anhydride (DSA), etc., among which DSA is preferable from the viewpoint of low vapor pressure.

The liquid phenol includes, for example, diallyl bisphenol A, diallyl bisphenol F, allylated phenol novolak resin, allylated dihydronaphthalene, diallyl resorcinol, etc., among which diallyl bisphenol F is preferable from the viewpoint of low viscosity.

The aromatic amine includes, for example, m-phenylenediamine, diaminodiphenylmethane, diaminodiphenylsulfone, diaminodiethyldiphenylmethane, monomethyldiethyl-m-phenylenediamine, etc., among which monomethyldiethylmethaphenylenediamine is preferable from the viewpoints of low viscosity and high stability.

The aromatic diazonium salt for use as a photo-curing initiator includes, for example, p-methoxybenzenediazonium hexafluorophosphate, etc. The aromatic sulfonium salt includes, for example, triphenylsulfonium hexafluorophosphate, etc. The aromatic iodonium salt includes, for example, diphenyliodonium hexafluorophosphate, etc. Furthermore, an aromatic iodosyl salt, an aromatic sulfoxonium salt, a metallocene compound, etc. can be used as other photo-curing promoters.

Practically, commercially available latent curing agents, such as amine adduct type Amicure series, products of Ajinomoto Fine Techno Co., can be used. Those having curing temperatures of 100° C. or lower are preferable.

These latent curing agents can be used desired compounding proportions depending on the equivalent weight in terms of epoxide groups of the used epoxy resin. Generally, the hydrolysis type latent curing agent can be used in a proportion of 0.5-2 equivalent weight in terms of the curing groups of amine, etc. generated by hydrolysis of the hydrolysis type latent curing agent on the basis of the epoxide groups of epoxy resin in a liquid state at room temperature. The thermally latent curing agent can be used in a proportion of 0.1-35 parts by weight in terms of the curing agent component such as dicyandiamide, imidazoles, hydrazines, amines, etc. on the basis of 100 parts by weight of total epoxy resins. The photo-curing initiator can be used in a proportion of 0.01-5 parts by weight on the basis of 100 parts by weight of epoxy resin. The amount of epoxy compound for use in master batch formation (epoxy adduct formation) can be included in the amount of total epoxy resins. The thermally latent curing agent can be formed master batch in advance with a portion (5-50 wt. %, preferably 10-30 wt. %) of epoxy resin. Master batch can be prepared by mixing the thermally latent curing agent with the epoxy resin at lower temperatures than the service temperature of the thermally latent curing agent, preferably in a temperature range of 20°-50° C., if necessary, followed by aging in that temperature range for about 1 to about 24 hours.

The highly heat-conductive filler has a heat conductivity of 0.5 W/m·K or more, as described earlier, and includes, for example, $Al_2O_3$, MgO, BN, AlN, $Al(OH)_3$, $Mg(OH)_2$, SiC, mixture thereof, etc., preferably $Al_2O_3$ or $Al(OH)_3$, and can be used in a proportion of about 300 to about 1,300 parts by weight, preferably about 500 to about 1,200 parts by weight, on the basis of 100 parts by weight of epoxy resin. When the proportion of the highly heat-conductive filler is less than about 300 parts by weight, the highly heat-conductive epoxy resin composition cannot have a sufficiently high heat-conductivity, whereas in the case of a proportion of more than about 1,300 parts by weight mixing will be hard to conduct.

The non-ionic surfactant includes, for example, polyoxyalkylene chain-containing non-ionic surfactants such as polyoxyethylene alkyl ether, polyoxyethylene alkyl aryl ether, alkyl aryl formaldehyde-condensed polyoxyethylene ether, block polymers with polyoxypropylenes as lipophilic groups, block copolymers with polyoxyethylene.polyoxypropylenes as lipophilic groups, polyoxyethylene fatty acid ester, polyoxyethylene glycerine fatty acid ester, polyoxyethylene sorbitan fatty acid ester, polyoxyethylene sorbitol fatty acid ester, polyoxyethylene fatty acid amide, etc.; siloxane-containing non-ionic surfactant such as polyoxyalkylene-modified polydimethylsiloxane, etc.; ester-type non-ionic surfactants such as glycerine fatty acid ester, polyglycerine fatty acid ester, sorbitan fatty acid ester, propyleneglycol fatty acid ester, sucrose fatty acid ester, etc.; nitrogen-containing type non-ionic surfactant such as fatty acid alkanol amide, etc., or fluorine-based, non-ionic surfactants.

The non-ionic surfactant can be used in a proportion of about 1 to about 50 parts by weight, preferably about 5 to about 40 parts by weight, on the basis of 100 parts by weight of the epoxy resin in a liquid state at room temperature. When the proportion of the non-ionic surfactant is less than about one parts by weight, there will occur such inconveniences as poor dispersibility of the highly heat-conductive epoxy resin composition and abnormally high viscosity, whereas in the case of a proportion of more than about 50 parts by weight a storage stability problem or a problem of failure to obtain cured epoxy resin products having desired physical properties will be encountered with a possibility. It is also unpreferable to use other surfactants than the non-ionic surfactant or polymeric dispersing agents, because the viscosity of the highly heat-conductive epoxy resin composition will be increased, or there will appear an imbalance between the storage stability and the curability.

The highly heat-conductive epoxy resin composition can be prepared by adding a highly heat-conductive filler to a mixture of epoxy resin and surfactant while suppressing heat generation caused by the addition of the filler to 50° C. or less, and adding a latent curing agent or a master batch thereof thereto.

To adjust the viscosity or thixotropy, the present highly heat-conductive epoxy resin composition can further contain, if required, other fillers such as silica, calcium carbonate, etc., a plasticizer, within such a range as not to spoil the object of the present invention.

The present highly heat-conductive epoxy resin composition can be cured at lower temperatures, e.g. 80° C. for one hour, and can be used in coating or bonding of various electronic parts and electrically-mounted parts requiring a high heat radiation, or can be used in mounting work, etc. as highly heat-radiatable parts.

EXAMPLES

The present invention will be described in detail below, referring to Examples.

Example 1

| | Parts by weight |
|---|---|
| Bisphenol F type epoxy resin (Adeka resin EP4901, a product of ADEKA) | 50 |
| Bisphenol A type epoxy resin (828, a product of Japan Expoxy resin Co.) | 50 |
| Non-ionic surfactant (polyoxyethylene lauryl ether; Emulgen 106, a product of Kao Corp., HLB 10.5) | 30 |
| Aluminum oxide (AS-50, a product of Showa-Denko K.K.) | 750 |
| Amine adduct-based latent curing agent (Amicure PN-23, a product of Ajinomoto Fine Techno Co.) | 15 |
| Amine adduct-based latent curing agent (Amicure PN-40, a product of Ajinomoto Fine Techno Co.) | 10 |

Among the foregoing components, aluminum oxide was added to a mixture of two kinds of the epoxy resins and the surfactant, while suppressing heat generation caused by addition of the filler to 50° C. or lower, and then adding two kinds of the latent curing agents thereto.

The thus prepared composition was subjected to determination of the following items:
Storage stability: Upon storage at 20° C. for one week, the stability was visually evaluated, where maintenance of some flowability was marked as "○", and occurrence of viscosity increase as "Δ", and complete solidification as "X"

Heat curability: Curability of composition cured by heating at 80° C. for one hour was evaluated visually or by finger touch, where complete curing was marked as "○" finger-sticky state as "Δ", and unsolidified state as "X"

Example 2

In Example 1, the same amount of Emulgen 123P (polyoxyethylene lauryl ether, a product of Kao Corp., HLB 16.9) was used as an non-ionic surfactant.

Example 3

In Example 1, the amount of bisphenol F type epoxy resin was reduced to 25 parts by weight from original 50 parts by weight, and 15 parts by weight from the resulting reduction surplus, i.e. 25 parts by weight (25% by weight based on total epoxy resin), of the epoxy resin was mixed with 15 parts by weight of latent curing agent Amicure PN-23, followed by standing at 40° C. for at least one day to form a latent curing agent master batch, whereas the remaining reduction surplus, i.e. 10 parts by weight, of the epoxy resin was mixed with 10 parts by weight of the latent curing agent Amicure PN-40, followed by standing at 40° C. for at least one day to form another latent curing agent master batch. These two kinds of the master batches were used in Example 3.

Example 4

In Example 2, the amount of the bisphenol F type epoxy resin was reduced to 25 parts by weight from the original 50 parts by weight, and 15 parts by weight of the resulting reduction surplus, i.e. 25 parts by weight (25% by weight based on total epoxy resin), of the epoxy resin was mixed with 15 parts by weight of the latent curing agent Amicure PN-23, followed by standing at 40° C. for at least one day to form a latent curing agent master batch, whereas the remaining reduction surplus, i.e., 10 parts by weight, of the epoxy resin was mixed with 10 parts by weight of latent curing agent Amicure PN-40, followed by standing at 40° C. for at least one day to form another latent curing agent master batch. These two kinds of master batches were used in Example 4.

Comparative Example 1

In Example 1, the same amount of a polymeric dispersing agent (DA325, a product of Kusumoto Kasei Co,; amine salt of polyether phosphoric acid ester; acid value 14, amine value 20) was used in place of the non-ionic surfactant.

Comparative Example 2

In Example 1, the same amount of a wetting dispersing agent (W996, a product of Big Chemie, Japan; a solution of copolymers having acidic groups, acid value 71 mgKOH/g) was used in place of the non-ionic surfactant.

Comparative Example 3

In Example 1, the same amount of a wetting dispersing agent (W9010, a product of Big Chemie, Japan; a solution of copolymers having acidic groups, acid value 129 mgKOH/g) was used in place of the non-ionic surfactant.

Comparative Example 4

In Example 1, the same amount of a methacrylic acid derivative (Light Ester M, a product of Kyoei K. K.; functional monomer-oligomer) was used in place of the non-ionic surfactant.

Comparative Example 5

In Comparative Example 1, the amount of bisphenol F type epoxy resin was reduced to 25 parts by weight from the original 50 parts by weight, and 15 parts by weight from the resulting reduction surplus, i.e. 25 parts by weight, of the epoxy resin was mixed with 15 parts by weight of the latent curing agent Amicure PN-23, followed by standing at 40° C. for at least one day to form a latent curing agent master batch, whereas the remaining reduction surplus, i.e. 10 parts by weight, of the epoxy resin was mixed with 10 parts by weight of the latent curing agent Amicure PN-40, followed by standing at 40° C. for at least one day to form another latent curing agent master batch. These two kinds of the latent curing agent master batches were used in Comparative Example 5.

Comparative Example 6

In Comparative Example 2, the amount of bisphenol F type epoxy resin was reduced to 25 parts by weight from the original 50 parts by weight, and 15 parts by weight from the resulting reduction surplus, i.e. 25 parts by weight, of the epoxy resin was mixed with 15 parts by weight of the latent curing agent Amicure PN-23, followed by standing at 40° C. for at least one day to form a latent curing agent master batch, whereas the remaining reduction surplus, i.e. 10 parts by weight, of the epoxy resin was mixed with 10 parts by weight of the latent curing agent Amicure PN-40, followed by standing at 40° C. for at least one day to form another latent curing agent master batch. These two kinds of the latent curing agent master batches were used in Comparative Example 6.

Results obtained in the foregoing Examples and Comparative Examples are shown in the following Table:

TABLE

| Example | Storage stability | Heat curability |
| --- | --- | --- |
| Ex. 1 | Δ | ○ |
| Ex. 2 | Δ | ○ |
| Ex. 3 | ○ | ○ |
| Ex. 4 | ○ | ○ |
| Comp. Ex. 1 | X | Δ |
| Comp. Ex. 2 | X | X |
| Comp. Ex. 3 | X | X |
| Comp. Ex. 4 | X | X |
| Comp. Ex. 5 | X | Δ |
| Comp. Ex. 6 | X | Δ |

The invention claimed is:

1. A highly heat-conductive epoxy resin composition, which comprises an epoxy resin in a liquid state at room temperature, an adduct of amine with an epoxy compound as a latent curing agent, a highly heat-conductive filler having a heat conductivity of 0.5 W/m·K or more, and a polyoxyethylene lauryl ether surfactant.

2. A highly heat-conductive epoxy resin composition according to claim 1, wherein the latent curing agent is a hydrolysis type latent curing agent, a thermally latent curing agent, or a photo-curing initiator.

3. A highly heat-conductive epoxy resin composition according to claim 2, which comprises 100 parts by weight of epoxy resin, 0.5-2 equivalent weights of a hydrolysis type latent curing agent as the latent curing agent in terms of curing groups generated by hydrolysis of the curing agent on the basis of the epoxide groups of the epoxy resin, or 0.1-35 parts by weight of a thermally latent curing agent as the latent curing agent, or 0.01-5 parts by weight of a photo-curing initiator as the latent curing agent, 300-1,300 parts by weight of the highly heat-conductive filler, and 1-50 parts by weight of the polyoxyethylene lauryl ether surfactant.

4. A highly heat-conductive epoxy resin composition according to claim 1, wherein the latent curing agent is used as a master batch together with the epoxy resin in a liquid state at room temperature.

5. A highly heat-conductive epoxy resin composition according to claim 1, wherein the highly heat-conductive filler is $Al_2O_3$, $MgO$, $BN$, $AlN$, $Al(OH)_3$, $Mg(OH)_2$ or a mixture thereof.

6. A highly heat-conductive epoxy resin composition according to claim 1, for use as a coating agent.

7. A highly heat-conductive epoxy resin composition according to claim 1, for use as an adhesive.

8. Highly heat-radiatable articles produced by curing a highly-heat-conductive epoxy resin composition according to claim 1.

* * * * *